United States Patent [19]

Nakamura et al.

[11] Patent Number: 5,317,034
[45] Date of Patent: May 31, 1994

[54] METHOD FOR PRODUCING MODIFIED POLYISOCYANURATE FOAMS

[75] Inventors: Satoshi Nakamura; Hirokatsu Shirahata, both of Tokyo, Japan

[73] Assignee: Nisshinbo Industries, Inc., Tokyo, Japan

[21] Appl. No.: 138,970

[22] Filed: Oct. 21, 1993

[51] Int. Cl.$^5$ .............................................. C08G 18/00
[52] U.S. Cl. ................................. 521/108; 521/129; 521/902
[58] Field of Search ...................... 521/108, 129, 902

[56] References Cited

U.S. PATENT DOCUMENTS

| | | | |
|---|---|---|---|
| 3,657,161 | 4/1972 | Bernard et al. | 260/2.5 AW |
| 3,887,501 | 6/1975 | Narayan et al. | 260/2.5 BF |
| 3,928,266 | 12/1975 | Cenker et al. | 260/2.5 BF |
| 3,981,829 | 9/1976 | Cenker et al. | 260/2.5 AC |
| 3,994,837 | 11/1976 | Kan et al. | 260/2.5 BF |
| 3,994,839 | 11/1976 | Cenker et al. | 260/2.5 AZ |
| 3,998,776 | 12/1976 | Wagener et al. | 260/20.6 SO |
| 4,166,164 | 8/1979 | Cenker et al. | 521/129 |

FOREIGN PATENT DOCUMENTS

| | | |
|---|---|---|
| 0381324 | 8/1990 | European Pat. Off. . |
| 46-26017 | 7/1971 | Japan . |
| 46-37503 | 11/1971 | Japan . |

*Primary Examiner*—Morton Foelak
*Attorney, Agent, or Firm*—Wenderoth, Lind & Ponack

[57] ABSTRACT

A method for producing a modified polyisocyanurate foam by reacting an organic polyisocyanate, polyol and water in the presence of a trimerization catalyst composed of a salt of 1,8-diaza-bicyclo[5.4.0]undecene-7, and a carbodiimidation catalyst composed of a certain phosphorene oxide. The method enables production of low density modified polyisocyanurate foams with ease and rapidly without using volatile blowing agents such as CFC, HCF, HFC pentane and methylene chloride.

13 Claims, No Drawings

METHOD FOR PRODUCING MODIFIED POLYISOCYANURATE FOAMS

This invention relates to a method for producing modified polyisocyanurate foam and, more particularly, to a method for producing modified polyisocyanurate foam suitable for continuous production of laminate boards, insulation boards and the like which method does not involve the use of evaporating type blowing agent such as CFC, HCFC, HFC, pentane and methylene chloride.

It is known to produce a modified polyisocyanurate foam by reacting an organic polyisocyanate and a polyol in the presence of a blowing agent and using an trimerization catalyst and a carbodiimidation catalyst in combination (cf., for example, U.S. Pat. No. 3,657,161. It has also been proposed to produce a modified polyisocyanurate foam by reacting an organic polyisocyanate and a polyol in the presence of a blowing agent and using methanol, furfuryl alcohol or phosphorene oxide (carbodiimidation catalyst) and an alkali metal salt (trimerization catalyst) in combination (U.S. Pat. No. 4,166,164, and European Patent No. 381,324). U.S. Pat. No. 3,887,501, U.S. Pat. No. 3,928,256, U.S. Pat. No. 3,998,776, U.S. Pat. No. 3,994,837, U.S. Pat. No. 3,981,829, U.S. Pat. No. 3,994,839 and so on have reported a method for producing modified polyisocyanurate foam using a tertiary amine and an alcohol such as an amino alcohol as cocatalysts, a method in which a Mannich polyol, a phosphorus containing polyol or the like is used catalytically, a method in which s-triazine and phenol are used.

For producing these (modified) polyisocyanurate foams, it is a general measure to use flon as a blowing agent. However, the use of CFC has a problem of breaking the ozone layer, and in near future the use of CFC and HCFC will be prohibited completely. While there is a possibility to use carbon dioxide gas generated by the reaction between water and isocyanate as a substitute for CFC, this is disadvantageous since increase in the amount of water with view to making low density foam leads to increase in the amount of urea bonds generated ($-NCO+H_2O\rightarrow-NH_2+CO_2\uparrow$, $-NH_2+OCN\rightarrow-NHCONH-$), and therefore there arises a problem of giving only those foams that have low strength, deteriorated dimensional stability, and poor adherability with surface materials. Also, in the above-described conventional method using an trimerization catalyst and a carbodiimidation catalyst in combination, it is difficult to control the reaction when water is used as a blowing agent, and in particular, it is impossible to produce low density rigid foam which have a density of not exceeding 40 kg/m$^3$ required for laminate boards or insulation boards at economically acceptable speeds.

Extensive research has been made on development of an industrially applicable method for producing a highly expanded modified polyisocyanurate foams having a density of not exceeding 40 kg/m$^3$ from an organic polyisocyanate and a polyol without using a volatile blowing agent represented by CFC, HCFC, HFC pentane and methylene chloride. As a result, it has not been found that the use of a combination of a catalyst selected from certain specified kinds of trimerization catalysts with a catalyst selected from certain specified kinds of carbodiimidation catalysts together with water enables trimerization reaction of a polyisocyanate and carbodiimidation reaction, a reaction between water and the polyisocyanate to proceed rapidly in a well balanced manner, so that modified polyisocyanurate foams having low densities as low as not exceeding 40 kg/m$^3$ can be obtained in a short time without using volatile type blowing agents such as CFC. This invention has been complete based on this discovery.

Therefore, according to this invention, there is provided a method for producing modified polyisocyanurate foam, comprising the step of;

reacting an organic polyisocyanate, a polyol and water in the presence of (a) a trimerization catalyst selected from salts of 1,8-diaza-bicyclo[5.4.0]undecene-7 represented by formula (I)

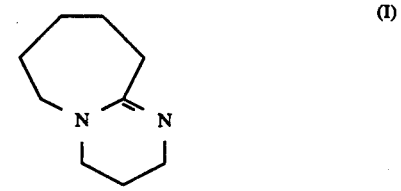

and (b) a carbodiimidation catalyst selected from phosphorene oxides represented by formula (II) or (III)

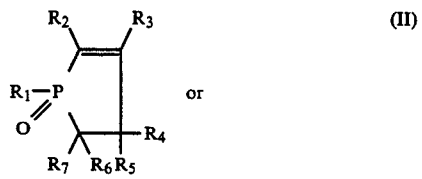

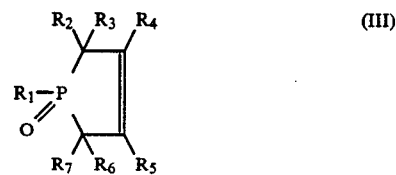

wherein R$_1$ represents substituted or unsubstituted alkyl, phenyl, naphthyl or benzyl group; R$_2$, R$_3$, R$_4$, R$_5$, R$_6$ and R$_7$ each represent independently H, Cl or a C$_1$-C$_4$ alkyl group.

Hereinafter, this invention will be described in more detail.

The organic polyisocyanates used in the method of this invention as starting materials may be any of aliphatic, alicyclic, and aromatic types, and mixtures of these. Those conventionally used in the production of polyurethanes and polyisocyanurates can be used similarly. To be specific, suitable examples thereof include aromatic diisocyanates such as 2,4-tolylene diisocyanate, 2,6-tolylene diisocyanate, crude tolylene diisocyanate, diphenylmethane diisocyanate, and crude diphenylmethane diisocyanate; aromatic triisocyanates such as 4,4'4''-triphenylmethane triisocyanate, and 2,4,6-tolylene triisocyanate; aromatic tetraisocyanates such as 4,4'-dimethyldiphenylmethane-2,2'5,5'-tetraiisocyanate, aliphatic isocyanates such as hexamethylene-1,6-diisocyanate; alicyclic isocyanates such as hydrogenated diphenylmethane diisocyanate; and other diisocyanates such as m-phenylene diisocyanate, naphthylene-1,5-diisocyanate, 1,-methoxyphenyl-2,4-diisocyanate, 4,4'-biphenyl diisocyanate, 3,3'-dimethoxy-4,4'-biphenyl diisocyanate, and 3,3'-dimethyldiphenylmethane- 4,4'-diisocyanate. Among them, preferred are 2,4-tolylene diisocyanate, 2,6-tolylene diisocyanate, crude tolylene diisocyanate, diphenylmethane diisocyanate, crude diphenylmethane diisocyanate, hexamethylene-1,6-diisocyanate, hydrogenated diphenylmethane diisocyanate, etc. The above-described organic polyisocyanates may be used singly or two or more of them may be combined.

The polyols include aliphatic, saccharide, aromatic compounds having two or more hydroxyl groups in the molecule, and mixtures thereof, such as polyether polyols, polyester polyols, and castor oil. Those conventionally used in the production of polyurethanes can also be used similarly. Those polyols may be of either lower molecular weight or high molecular weight. Specific examples thereof include, as polyether polyols, those compounds having structures of active hydrogen-containing compounds such as polyhydric alcohols, polyhydric phenols, amines, or polycarboxylic acids to which alkylene oxides are added. As the polyhydric alcohols, there can be cited, for example, dihydric alcohols such as ethylene glycol, propylene glycol, 1,4-butanediol, 1,6-hexanediol, diethylene glycol, and neopentyl glycol; trihydric or higher polyhydric alcohols such as pentaerythritol, and surcrose. As the polyhydric phenols, there can be cited, for example, polyhydric phenols such as pyrogallol, and hydroquinone; bisphenols such as bisphenol A; condensates of phenol and formaldehyde; and so on. As the amines, there can be cited, for example, ammonia, alkanolamines such as mono-, di- and triethanolamines, isopropanolamine, and aminoethylethanolamine; $C_1$-$C_{22}$ alkylamines, $C_2$-$C_6$ alkylenediamines, polyalkylenepolyamines, aromatic amines such as aniline, phenylenediamine, diaminotoluene, xylenediamine, methylenedianiline, and diphenyletherdiamine, alicyclic amines such as isophoronediamine, and cyclohexylenediamine, heterocyclic amines, and so on. As the polycarboxylic acids, there can be cited, for example, aliphatic polycarboxylic acids such as succinic acid, adipic acid, sebacic acid, maleic acid, and dimeric acid, aromatic polycarboxylic acids such as phthalic acid, terephthalic acid, trimellitic acid, and pyromelitic acid, etc. These active hydrogen-containing compounds may also be used as a mixture of two or more of them. As the alkylene oxides to be added to the active hydrogen-containing compounds, there can be cited, for example, propylene oxide, ethylene oxide, butylene oxide, tetrahydrofuran, etc. These alkylene oxides may be used singly or two or more of them may be used in combination. In the latter case, there may be blocked adducts or randomly added products. As the polyester polyols, there can be cited, for example, condensed polyester polyols obtained by the reaction between polyhydric alcohols (the aforementioned alcohols, trimethylolpropane, glycerol, etc.) and carboxylic acids (the aforementioned polycarboxylic acids, etc.), polyester polyols obtained by ring opening polymerization lactone, scrap PET to which ethylene oxide adduct of nonylphenol is added, and the like. Among them, aliphatic, aromatic, aliphatic or aromatic amine, pentaerythritol, or sucrose based polyether polyols; aromatic or aliphatic carboxylic acid polyester polyols; lactone polyester polyols; etc. are particularly preferred. The aforementioned polyols may be used singly or two or more of them may be used in combination.

The aforementioned polyols may have a hydroxyl number within the range of generally 20 to 600 mgKOH/g, preferably 25 to 500 mgKOH/g, more preferably 50 to 400 mgKOH/g.

According to the method of this invention, polyisocyanurate foams can be generated by the reaction of the aforementioned organic polyisocyanate with the aforementioned polyol together with water as a blowing agent. To perform the reaction, compounding proportions of the organic polyisocyanate, the polyol and water are not limited strictly, and may vary widely depending on desired physical properties and uses of final products of modified polyisocyanurate foams. Generally, it is preferred to react the aforementioned components after blending them such that isocyanate index expressed as NCO/OH equivalent ratio can become within the range of not below 1.8, preferably from 1.8 to 5, more preferably 2 to 4.

The amount of water to be used as a blowing agent can be controlled depending on the density and the like desired for final products of the modified polyisocyanurate foam. In particular, the method of this invention has a feature that low density rigid foam magnifications can be produced by using only water and without using volatile blowing agents. According to the method of this invention, addition of water in amounts within the range of, for example, 0.3 to 1.8% by weight, preferably 0.8 to 1.5% by weight, based on the total weight of organic polyisocyanate, polyol and water enables production of low density foam having a free rise density of generally 40 kg/m$^3$, preferably 25 to 35 kg/m$^3$, with ease without using volatile blowing agents.

The method of this invention is characterized in that the reaction for producing a modified polyisocyanurate foam from the aforementioned organic polyisocyanate, polyol and water is practiced in the presence of (a) a trimerization catalyst selected from salts of 1,8-diazabicyclo[5.4.0]undecene-7 represented by formula (I)

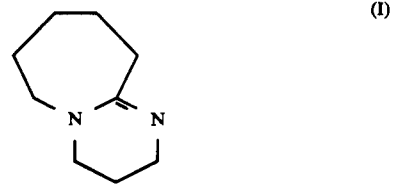

and (b) a carbodiimidation catalyst selected from phosphorene oxides represented by formula (II) or (III)

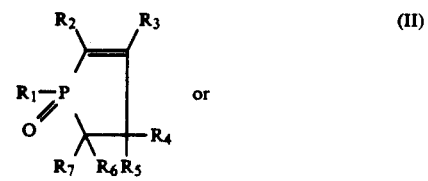

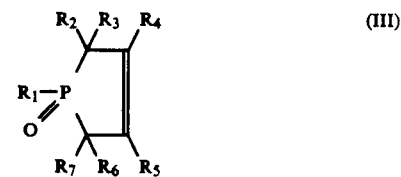

wherein $R_1$ represents substituted or unsubstituted alkyl, phenyl, naphthyl or benzyl group; $R_2$, $R_3$, $R_4$, $R_5$, $R_6$ and $R_7$ each represent independently H, Cl or a $C_1$-$C_4$ alkyl group.

Salts of 1,8-diaza-bicyclo[5.4.0]undecene-7 (hereafter abbreviated as DBU) represented by the above formula (I) are known per se as a catalyst for preparation of polyurethane, polyisocyanurate and polyurethanepolyisocyanurate resins, etc. (refer to Japanese Patent Publication No. 37503/1971 and Japanese Patent Publication No. 25017/1971), and can be obtained by reaction of DBU with acids such as phenols or fatty acids. As phenols usable for formation of these salts, thee can, for example, be mentioned monohydric alcohols such as phenol, cresols, xylenols, naphthols, trimethylphenols, tetramethylphenols, pentamethylphenols, ethylphenols, n- and iso-propylphenols, n- and iso-butylphenols, clclohexylphenols, n- and iso-amylphenols, iso-octylphenols, iso-nonylphenols, iso-dodecylphenols, di- and poly-substituted phenols (for example, thymol, carbacrol, di-isoalkylphenols) and methoxylphenols (e.g., eugenol, guaiacol); dihydric phenols such as catechols, resorcinols, hydroqinones and bisphenols; and polyhydric phenols such as pyrogallol and phyloroglucinol. Further, as fatty acids, there can, for example, be mentioned saturated fatty acids such as formic acid, acetic acid, propionic acid, butyric acid, valeric acid, caproic acid, enanthic acid, caprylic acid, pelargonic acid, capric acid, undecyclic acid, lauric acid, tridecyl acid, myristic acid, pentadecyclic acid, palmitic acid, heptadecylic acid and stearic acid; unsaturated fatty acids such as acrylic acid, crotonic acid, iocrontonic acid, undecylenic acid, oleic acid, elaidic acid, cetoleic acid, erucic acid, brassidic acid, sorbic acid, linolic acid, linolenic acid, arachidonic acid, propiolic acid and stearolic acid; isoalkyl fatty acids such as 2-ethylhexanoic acid; oxyfatty acids such as lactic acid, glycolic acid, ricinolic acid and oxystearic acid. In addition, it is also possible to use weak acids such as, for example, benzoic acid, salicylic acid, enolic acid (e.g., barbituric acid), carbonic acid and phosphoric acid. Particularly preferably used among these acids are phenol, 2-ethylhexanoic acid, oleic acid, formic acid, etc.

On the other hand, as for the compounds represented by the formula (II) or (III) used in combination with the aforementioned DBU salts, the alkyl group represented by $R_1$ may be either straight chain or branched chain, or partially substituted with halogen or other functional groups. Examples of such an alkyl group include methyl, ethyl, propyl, isopropyl, n-butyl, tertbutyl, 2-phenylethyl, 2-chloroethyl, 2-methoxyethyl, etc. groups. The substituted or unsubstituted phenyl, naphthyl and benzyl group include benzyl, phenyl, o-, p- or m-tolyl, xylyl, naphthyl, 4-diphenyl, o-, p- or m-chlorphenyl, etc. $R_1$ may preferably be a $C_1$–$C_4$ alkyl group, a phenyl group, or a benzyl group. The groups represented $R_2$–$R_7$ of formula (II) or (III) include hydrogen, chlorine, methyl, ethyl, propyl, isopropyl, butyl, etc., preferably hydrogen and methyl.

Specific examples of phosphorene oxide represented by formula (II) or (III) include the following: 1-methylphosphorene oxide, 3-methyl-1-phenylphosphorene oxide, 3-methyl-1-benzyl-phosphorene oxide, 3-methyl-1-ethylphosphorene oxide, 3-methyl-1-ethylphenylphosphorene oxide, 1-phenyl-3-(4-methyl-3-pentenyl)-phosphorene oxide, 1-phenyl-3-chlorophosphorene oxide, etc. Among these phosphorene oxides, especially 3-methyl-1-phenylphosphorene oxide, 3-methyl-1-phenyl-2-phosphorene oxide and 3-methyl-1-phenyl-3-phosphorene oxide are used suitably. These phosphorene oxides are known per se as a catalyst for accelerating the reaction for producing carbodiimide linkage form organic isocyanates (cf., for example, U.S. Pat. No. 3,657,161).

This invention is characterized by the use of specified combination of the salts of DBU represented by formula (I) above (trimerization catalyst) with phosphorene oxides represented by formula (II) or (III) (carbodiimidation catalyst) as a catalyst for producing modified polyisocyanurate foams from organic polyisocyanates, polyols and water. Hence, it is successful to produce low density modified polyisocyanurate foams by an industrially applicable method without using volatile blowing agents such as CFC and HCFC which introduces problems.

Amounts of the salts of DBU represented by formula (I) above (trimerization catalyst) with phosphorene oxides represented by formula (II) or (III) (carbodiimidation catalyst) to be used are not limited strictly and may vary depending on reaction conditions used as the like. It is suitable that based on the weight of the organic polyisocyanate, the former, i.e., the trimerization catalyst, is used in amounts within the range of generally 0.1 to 10% by weight, preferably 0.5 to 5% by weight, while the latter, i.e., the carbodiimidation catalyst is used in amounts within the range of generally 0.05 to 5% by weight, preferably 0.1 to 2% by weight.

Relative proportion of the trimerization catalyst (a) to the carbodiimidation catalyst (b) may vary within a wide range depending on physical properties desired for final products. The weight ratio of trimerization catalyst (a)/carbodiimidation catalyst (b) is within the range of usually 0.5/1 to 20/1, preferably 1/1 to 10/1.

In the method of this invention, there can be used various additives in combination in amounts usually used. Such additives include, for example, urethanating catalysts (for example, triethylenediamine, dimethylethanolamine, triethylamine, trimethylaminoethylethanolamine, dimethylaminoethylether, pentamethyldiethylenetriaime, N-methyl-morpholine, dibutyltin dilaurate, tin octanoate, lead octanoate, etc.), surfactants (for example, dimethylsiloxane/polyether block copolymer, etc.), crosslinking and chain extender agent (for example, ethylene glycol, propylene glycol, 1,4-butanediol, 1,6-hexanediol, diethylene glycol, triethanolamine, diethanolamine, ethylenediamine, toluenediamine, etc.), flame retardants (for example, triphenyl phosphate, triethyl phosphate, trimethyl phosphate, cresyldiphenyl phosphate, tris(cresyl) phosphate, tris(chloroethyl) phosphate, tris(dichloropropyl) phosphate, tris($\beta$-chloropropyl) phosphate, tris($\beta$-chloroethyl) phosphate, tris(2,3-dibromopropyl) phosphate, tris(bromocresyl) phosphate, melamine, antimony triolxide, etc.), colorants, etc.

As the method for producing modified polyisocyanurate foams from the components described above, there can be cited, for example, a method in which first there are provided an isocyanate component composed of the aforementioned organic polyisocyanate or an isocyanate-terminated prepolymer component obtained by reacting an organic polyisocyanate with a polyol, and a polyol component from the above-described polyol, water, trimerization catalyst and carbodiimidation catalyst, and optionally one or more of the urethane catalyst, surfactant, crosslining agent, flame retardant, colorant and other additives, and then upon use, the both components are put together, rapidly stirred and mixed. The resulting mixture is foamed and cured.

It is sufficient to set the reaction temperature at room temperature. In some cases, the reaction temperature may be elevated up to a temperature of about 90° C.

Hereinafter, this invention will be described more concretely.

EXAMPLES 1-15 AND COMPARATIVE EXAMPLES 1-5

A polyol component prepared by mixing predetermined amounts of polyols, water, catalysts, a surfactant and a flame retardant shown in Table 1 below were mixed to prepare 25 g (50 g in Example 15) each of polyol components with 75 g (50 g in Example 15) of crude MDI (diphenylmethane diisocyanate), and the mixture was stirred for 5 seconds with a hand drill (2,200 rpm, stirrer: 300 mm$\phi$). The mixture (80 g) was poured in a 150×150×150 mm wood box, and measurement was made of cream time and rise time. Cream time was defined as a time from liquefaction to initiation of foaming, and rise time was defined as a time from the initiation of foaming to completion of the foaming. After 1 minutes foam was touched to judge curing state of its surface. A central portion of the cured foam was cut to a size of about 100×100×100 mm, and free rise density was calculated from its volume and weight.

Results obtained are shown in Table 1.

TABLE 1

| | Example (unit: g) | | | | | | | |
|---|---|---|---|---|---|---|---|---|
| | 1 | 2 | 3 | 4 | 5 | 6 | 7 | 8 |
| Polyol[1] | | | | | | | | |
| Polyol A | 16.0 | 16.0 | 16.0 | 16.0 | 16.0 | 16.0 | 16.0 | 16.0 |
| Polyol B | | | | | | | | |
| Polyol C | | | | | | | | |
| Polyol D | | | | | | | | |
| Polyol E | | | | | | | | |
| Water | 1.2 | 1.2 | 1.2 | 1.2 | 0.8 | 1.4 | 1.2 | 1.2 |
| Catalyst[2] | | | | | | | | |
| SA-102 | 1.6 | 1.6 | 1.6 | 1.6 | 1.6 | 1.6 | 1.6 | 1.6 |
| DMEA | 0.2 | 0.2 | 0.2 | 0.2 | 0.2 | 0.3 | | |
| TEDA | | | | | | | 0.1 | |
| KAO No. 1 | | | | | | | | 0.1 |
| 3-Methyl-1-phenyl-2-phosphorene oxide | 0.2 | 0.5 | | 1.2 | 0.5 | 0.5 | 0.5 | 0.5 |
| 3-Methyl-1-phenyl-3-phosphorene oxide | | | 0.5 | | | | | |
| Surfactant[3] | 0.5 | 0.5 | 0.5 | 0.5 | 0.5 | 0.5 | 0.5 | 0.5 |
| Flame retardant[4] | 5.3 | 5.0 | 5.0 | 4.3 | 5.4 | 4.7 | 5.1 | 5.1 |
| Total polyol component | 25.0 | 25.0 | 25.0 | 25.0 | 25.0 | 25.0 | 25.0 | 25.0 |
| Crude MDI | 75.0 | 75.0 | 75.0 | 75.0 | 75.0 | 75.0 | 75.0 | 75.0 |
| Isocyanate index | 2.40 | 2.40 | 2.40 | 2.40 | 3.00 | 2.18 | 2.40 | 2.40 |
| Cream time (second) | 5 | 6 | 6 | 6 | 7 | 5 | 7 | 5 |
| Rise time (second) | 32 | 34 | 33 | 37 | 41 | 32 | 30 | 36 |
| Curing after 1 minute | ○ | ○ | ○ | ○ | ○ | ○ | ○ | ○ |
| Free rise density (kg/m$^3$) | 28 | 27 | 27 | 24 | 32 | 23 | 31 | 26 |

| | Example (unit: g) | | | | | | |
|---|---|---|---|---|---|---|---|
| | 9 | 10 | 11 | 12 | 13 | 14 | 15 |
| Polyol[1] | | | | | | | |
| Polyol A | | | | 16.0 | 16.0 | 21.3 | 16.0 |
| Polyol B | 16.0 | | | | | | |
| Polyol C | | 16.0 | | | | | |
| Polyol D | | | 16.0 | | | | |
| Polyol E | | | | | | | 25.0 |
| Water | 1.2 | 1.2 | 1.2 | 1.2 | 1.2 | 0.8 | 0.8 |
| Catalyst[2] | | | | | | | |
| SA-102 | 1.6 | | | | 1.8 | 1.6 | 1.2 |
| SA-No. 1 | | 1.2 | | | | | |
| SA-106 | | | 1.8 | 1.8 | | | |
| DMEA | 0.2 | 0.2 | 0.2 | 0.2 | | 0.3 | 0.3 |
| 3-Methyl-1-phenyl-2-phosphorene oxide | 0.5 | 0.5 | 0.5 | 0.5 | 0.5 | 0.5 | 0.5 |
| Surfactant[3] | 0.5 | 0.5 | 0.5 | 0.5 | 0.5 | 0.5 | 0.5 |
| Flame retardant[4] | 5.0 | 5.4 | 4.8 | 4.8 | 5.0 | | 5.7 |
| Total polyol component | 25.0 | 25.0 | 25.0 | 25.0 | 25.0 | 25.0 | 50.0 |
| Crude MDI | 75.0 | 75.0 | 75.0 | 75.0 | 75.0 | 75.0 | 50.0 |
| Isocyanate index | 2.14 | 2.14 | 2.16 | 2.40 | 2.40 | 2.57 | 1.87 |
| Cream time (second) | 7 | 5 | 7 | 7 | 10 | 8 | 7 |
| Rise time (second) | 32 | 34 | 43 | 32 | 47 | 41 | 48 |
| Curing after 1 minute | ○ | ○ | ○ | ○ | ○ | ○ | ○ |
| Free rise density (kg/m$^3$) | 28 | 31 | 27 | 29 | 28 | 29 | 33 |

| | Comparative Example (unit: g) | | | | |
|---|---|---|---|---|---|
| | 1 | 2 | 3 | 4 | 5 |
| Polyol[1] | | | | | |
| Polyol A | 16.0 | 16.0 | 16.0 | 16.0 | 16.0 |
| Water | 1.2 | 1.2 | 1.2 | 1.2 | 1.2 |
| Catalyst[2] | | | | | |
| SA-102 | | 1.6 | | | |
| Curithene 52 | | | 2.0 | | |
| DMP-30 | | | | | 2.2 |

TABLE 1-continued

| | | | | | |
|---|---|---|---|---|---|
| TAP | | | | | 1.2 |
| DMEA | 0.3 | 0.3 | 0.3 | 0.1 | 0.1 |
| 3-Methyl-1-phenyl-2-phosphorene oxide | 0.5 | | 0.5 | 0.5 | 0.5 |
| Surfactant[3] | 0.5 | 0.5 | 0.5 | 0.5 | 0.5 |
| Flame retardant[4] | 6.5 | 5.4 | 4.5 | 4.5 | 5.5 |
| Total polyol | 25.0 | 25.0 | 25.0 | 25.0 | 25.0 |
| Crude MDI | 75.0 | 75.0 | 75.0 | 75.0 | 75.0 |
| Isocyanate index | 2.40 | 2.40 | 2.40 | 2.40 | 2.40 |
| Cream time (second) | 10 | 6 | 8 | 3 | 5 |
| Rise time (second) | 240< | 38 | 50 | 70 | 150 |
| Curing after 1 minute | X | O | X | X | X |

TABLE 1-continued

| Free rise density (kg/m³) | 20 | 44 | 22 | 20 | 20 |
|---|---|---|---|---|---|

Note (1): Polyols
Polyol A: Phthalic acid ester based polyol, hydroxyl number = 315 (APP-315, manufactured by Union Carbide);
Polyol B: Pentaerythritol based polyol, hydroxyl number = 410 (410NE, manufactured by Asahi Glass);
Polyol C: Sugar-Aromatic amine based polyol, hydroxyl number = 410 (RX-403, manufactured by Sanyo Chemical Industries);
Polyol D: Aliphatic based polyol, hydroxyl number = 400 (GP-400, manufactured by Sanyo Chemical Industries);
Polyol E: Aliphatic based polyol, hydroxyl number = 28.5 (FA-718, manufactured by Sanyo Chemical Industries)
Note (2): Catalysts
SA-102

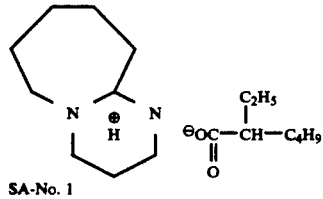

SA-No. 1

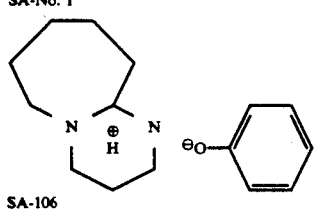

SA-106

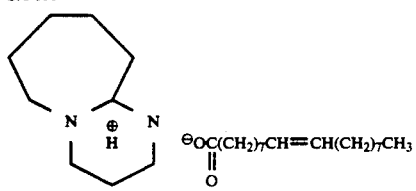

DMEA: Urethanating catalyst $(CH_3)_2NCH_2CH_2OH$
TEDA: Urethanating catalyst

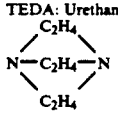

KAO No. 1: Urethanating catalyst (manufactured by Air Products and Chemicals)

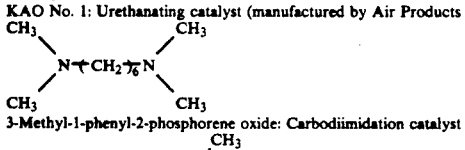

3-Methyl-1-phenyl-2-phosphorene oxide: Carbodiimidation catalyst

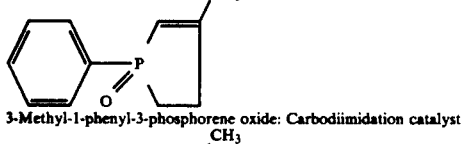

3-Methyl-1-phenyl-3-phosphorene oxide: Carbodiimidation catalyst

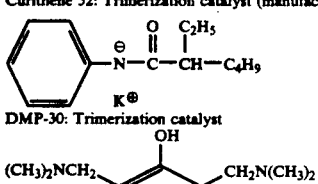

Curithene 52: Trimerization catalyst (manufactured by Air Products and Chemicals)

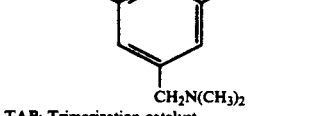

DMP-30: Trimerization catalyst

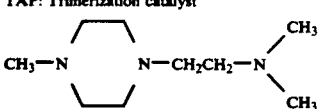

TAP: Trimerization catalyst

Note (3): Surfactant
Dimethylsiloxane-polyether block copolymer (SZ-1267, manufactured by Nippon Unicar)
Note (4): Flame retardant
Tris(β-chloropropyl) phosphate (Fyrol PCF, manufactured by Akzo Kashima)

Table 2 shows results of measurements of physical properties of modified polyisocyanurate foams obtained in Example 1 above.

TABLE 2

| Item | Unit | | Measured value | Standard conditions, etc |
|---|---|---|---|---|
| Core density | | $kg/m^3$ | 28.0 | JIS A-9514 |
| Compressive | ‖ | $kg/cm^2$ | 1.6 | JIS A-9514 |
| strength | ⊥ | | 1.0 | |
| Flexural strength | ‖ | $kg/cm^2$ | 2.4 | JIS A-9514 |
| Peel | aluminum | kg/5 cm | 2.2 | Cross head |
| strength | paper | kg/10 cm | >1.5 | speed 5 mm/min |
| Thermal conductivity | | kcal/m · hr · °C. | 0.0247 | JIS A-9514 |
| Oxygen index | | — | 24.0 | JIS K-7201 |
| Closed cell content | | % | 12 | ASTM D-1940 |
| Water absorption | | $g/100\ cm^2$ | 0.58 | JIS A-9514 |
| High temperature | ‖ | % | −0.24 | 80 × 80 × 50 mm |
| dimensional | ⊥ | | −0.20 | 80° C. 24 hr |
| stability | | | | |
| Low temperature | ‖ | % | −0.14 | 80 × 80 × 50 mm |
| dimensional | ⊥ | | −0.12 | −20° C. 24 hr |
| stability | | | | |
| Humid high | ‖ | % | −0.38 | 80 × 80 × 50 mm |
| temperature | ⊥ | | −0.41 | 80° C. 90% RH |
| dimensional | | | | 24 hr |
| stability | | | | |

EXAMPLE 16

Procedure of Example 1 was applied to an actual insulation board continuous production line.

Foaming apparatus: Low pressure foaming apparatus (forced stirring method). G-05 model (home made), output amount: 2.0 kg/minute.

Double conveyor: conveyor length; 18 m, conveyor speed; 10 m/minute

Cutter: running circular saw cutter, cutting was performed 2 minutes and 20 seconds after the pouring.

Molded article: facing material; front surface: decorated aluminum plate of 0.32 mm thick, back surface: aluminum craft paper.

Molded article: width; 350 mm, thickness; 18 mm.
Temperature conditions:
polyol component; 25° C.
isocyanate component; 40° C.
facing material; 20° C.
conveyor; 75° C.

When continuous molding was performed under the above-described conditions, no problem arose with respect to packing, curing and cutting properties, and molded articles encountered no problem with respect to warpage, shrink, adhesion with paper and aluminum, etc.

Major physical properties of continuous line products:

| Foam density | 38 $kg/m^3$ |
|---|---|
| Peel strength (paper) | 2.2 kg/10 cm |
| Oxygen index | 24 |
| Compressive strength | 1.5 $kg/m^2$ |

What is claimed is:

1. A method for producing modified polyisocyanurate foam, comprising the step of:
reacting an organic polyisocyanate, polyol and water is practiced in the presence of (a) a trimerization catalyst selected from salts of 1,8-diaza-bicyclo[5.4.0]-undecene-7 represented by formula (I)

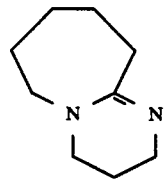

(I)

and (b) a carbodiimidation catalyst selected from phosphorene oxides represented by formula (II) or (III)

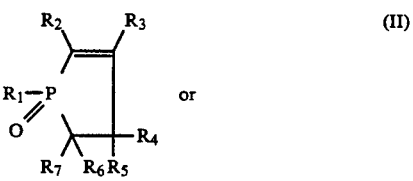

(II)

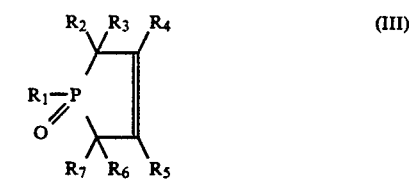

(III)

wherein $R_1$ represents substituted or unsubstituted alkyl, phenyl, naphthyl or benzyl group; $R_2$, $R_3$, $R_4$, $R_5$, $R_6$ and $R_7$ each represent independently H, Cl or a $C_1$-$C_4$ alkyl group.

2. A method of claim 1, wherein the salt of 1,8-diazabicyclo[5.4.0]undecene-7 is a salt with phenol, 2-ethylhexanoic acid, oleic acid or formic acid.

3. A method of claim 1, wherein said phosphorene oxide is a compound represented by formula (II) or (III) in which $R_2$, $R_3$, $R_4$, $R_5$, $R_6$ and $R_7$ each represent independently a hydrogen atom, a chlorine atom, a methyl group, an ethyl group, a propyl group, an isopropyl group or a butyl group.

4. A method of claim 1, wherein said phosphorene oxide is selected from the group consisting of 1-methylphosphorene oxide, 3-methyl-1-phenylphosphorene oxide, 3-methyl-1-benzylphosphorene oxide, 3-methyl- 1-ethylphosphorene oxide, 3-methyl-1-ethylphenylphosphorene oxide, 1-phenyl-3-(4-methyl-3-pentenyl)-phosphorene oxide and 1-phenyl-3-chlorophosphorene oxide.

5. A method of claim 1, wherein said phosphorene oxide is 3-methyl-1-phenylphosphorene oxide.

6. A method of claim 1, wherein said trimerization catalyst (a) is used in an amount within the range of 0.1 to 10% by weight based on the weight of said organic polyisocyanate.

7. A method of claim 1, wherein said carbodiimidation catalyst (b) is used in an amount within the range of 0.05 to 5% by weight based on the weight of said organic polyisocyanate.

8. A method of claim 1, wherein weight ratio of said trimerization catalyst (a)/said carbodiimidation catalyst (b) is within the range of 0.5/1 to 20/1.

9. A method of claim 1, wherein said organic polyisocyanate is selected from the group consisting of 2,4-tolylene diisocyanate, 2,6-tolylene diisocyanate, crude tolylene diisocyanate, diphenylmethane diisocyanate, crude diphenylmethane diisocyanate, hexamethylene-1,6-diisocyanate, and hydrogenated diphenylmethane diisocyanate.

10. A method of claim 1, wherein said polyol is at least one polyol having a hydroxyl number within the range of 20 to 600 mgKOH/g.

11. A method of claim 1, wherein compounding proportions of said organic polyisocyanate, said polyol and said water are such that isocyanate index defined by NCO/OH equivalent ratio is not below 1.8.

12. A method of claim 1, wherein said water is used in an amount within the range of 0.3 to 1.8% by weight based on the total weight of said organic polyisocyanate, said polyol and said water.

13. A method of claim 1, wherein said modified polyisocyanurate foam has a free rise density of not exceeding 40 kg/m$^3$.

* * * * *